(12) United States Patent
Lee et al.

(10) Patent No.: US 7,291,689 B1
(45) Date of Patent: Nov. 6, 2007

(54) THERMALLY STABLE LOW DIELECTRIC NORBORNENE POLYMERS WITH IMPROVED SOLUBILITY AND ADHESION PROPERTY

(75) Inventors: Jin Kyu Lee, Seoul (KR); Dong Woo Yoo, Hwaseong-si (KR); Seung Jae Yang, Jeonju-si (KR); Kook Heon Char, Seoul (KR); Joo Hyeon Park, Ulsan Metropolitan (KR)

(73) Assignee: Seoul National University Industry Foundation, Seoul (KR)

( * ) Notice: Subject to any disclaimer, the term of this patent is extended or adjusted under 35 U.S.C. 154(b) by 0 days.

(21) Appl. No.: 11/414,347

(22) Filed: May 1, 2006

(51) Int. Cl.
C08F 232/08 (2006.01)
G03C 1/835 (2006.01)

(52) U.S. Cl. .................... 526/283; 526/280; 526/281; 430/270.1; 430/319; 438/780

(58) Field of Classification Search ............ 430/270.1, 430/319; 526/280, 281, 283; 438/780
See application file for complete search history.

(56) References Cited

U.S. PATENT DOCUMENTS 4,080,491 A * 3/1978 Kobayashi et al. ......... 526/137
6,753,127 B2 * 6/2004 Han et al. ................ 430/270.1
7,033,729 B2 * 4/2006 Jung et al. ............... 430/270.1

* cited by examiner

*Primary Examiner*—Fred Teskin
(74) *Attorney, Agent, or Firm*—Dickstein Shapiro LLP (57) ABSTRACT

The present invention provides norbornene-based copolymers for which one monomer is at least selected from a group consisting of norbornene and dicyclopentadiene, and the other from norbornene-based comonomers of Formula 1 shown below:

Formula 1:

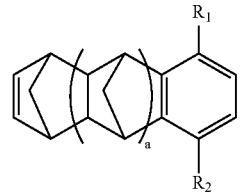

In Formula 1, $R_1$, $R_2$ and a are defined in this specification.

The present invention provides insulating elements for multi-chip packages and antireflection films for the exposure process of semiconductor fabrication using said norbornene-based copolymers. Norbornene-based copolymers according to the present invention have low dielectric constant as well as high thermal stability and excellent solubility to various organic solvents.

12 Claims, 6 Drawing Sheets

THERMALLY STABLE LOW DIELECTRIC NORBORNENE POLYMERS WITH IMPROVED SOLUBILITY AND ADHESION PROPERTY

TECHNICAL FIELD

The present invention is related to norbornene-based copolymers. More specifically, the present invention concerns with norbornene-based copolymers with low dielectric constant as well as excellent solubility to various common organic solvents.

BACKGROUND ART

Due to recent rapid development of information and communication techniques, astronomical amount of data needs to be processed or stored at a fast rate. As a result, semiconductor chips in one electronic system are required to transform from the mono-chip form to the multi-chip package form connecting several chips by a paratactically treating way. For use in circuits of such multi-chip packages, the development of low dielectric insulating materials with excellent thermal and mechanical properties is essential. Particularly, in view of reducing signal delays and capacitances being critical to the device performance, the timely development of insulating filling materials with lower dielectric constant is required. Moreover, low dielectric materials used as, for example, interlayer dielectric materials of thin film transistors of liquid crystal displays or other electronic devices are the core elements of the devices because such low dielectric materials can function as protecting integrated circuits, increasing the processing rate of the devices, reducing the power consumption, and reducing the weight of the devices. Consequently, the development of such low dielectric materials with properties, which can be compatible with existing and/or future fabrication methods, is crucial.

According to the ITRS (International Technology Roadmap for Semiconductors) prediction of U.S. semiconductor industry, low dielectric materials for multi-chip packages, that are to be developed before the year 2005, must have excellent properties such as a dielectric constant of no more than 2.0, thermal stability above 300° C. and low hygroscopicity among others. In addition, after the year 2005, there will be additional requirement for materials to develop ultrafast data processing systems based on optical circuits as well as on electronic circuits. Organic thin-film materials targeted for such optoelectronic systems must have a relevant index of refraction, high optical transparency, and low loss of light.

Conventionally, silicon oxide films ($SiO_2$) have been dominantly used for the insulating materials of semiconductor packages as well as interlayer insulating elements. However, since $SiO_2$ has a high dielectric constant above 4.0, it has already reached the limitation to be considered as interchip packaging materials of the next generation. Accordingly, various trials have already been conducted to develop low dielectric materials for the next-generation packages. Examples of low dielectric materials developed up until now include polyimides, benzocyclobutenes, polynorbornenes, and so forth.

Polyimides among the group mentioned above have a high dielectric constant of 2.9~3.5 and high hygroscopicity, and electrical/optical anisotropy occurs in polyimides due to its inherent chemical structures. Benzocyclobutenes developed by Dow also have a high dielectric constant of about 2.7. Moreover, the process to prepare thin films based on benzocyclobutenes is known to be rather complex and their adhesion to metal surfaces are poor.

Polynorbornenes have excellent properties such as high thermal stability, low hygroscopicity, electrical/optical isotropy among others but have poor adhesion to metals. Recently, BF Goodrich synthesized a new class of polynorbornenes by incorporating a silicon compound containing alkoxy groups to the norbornene monomer in order to improve the adhesion to metals. However, the prepared polynorbornene has a high dielectric constant of about 2.7. Thus, materials with excellent thermal and mechanical properties, yet maintaining low dielectric constant, are required for use as an element for semiconductor packages of the next generation.

From the fabrication perspectives, on the other hand, above mentioned low-dielectric materials should also possess excellent solubility to common organic solvents. Conventional norbornene-based copolymers, however, have poor solubility to organic solvents. As a result, when optoelectronic systems are to be fabricated by spin-coating using such conventional norbornene-based copolymers, there are drawbacks such that a certain solvent must be used at a higher temperature. In order to resolve this kind of drawback, various trials have been conducted such as controlling the design of comonomers used in the copolymers, the content of comonomer in the copolymers, molecular weight of the copolymers, and so forth.

DISCLOSURE OF THE INVENTION

Present inventors have found that when norbornene-based monomers based on hydroxybenzene and/or alkoxybenzene are used as one comonomer component in norbornene-based copolymers, solubility of such norbornene-based copolymers in organic solvents is greatly improved. In particular, present inventors have found that when a norbornene-based monomer comprising alkoxybenzene is used as a comonomer, thermal stability of norbornene-based copolymer also can be improved.

Thus, the present invention provides norbornene-based copolymers with improved solubility to organic solvents and also with high enough thermal stability commensurate with current fabrication process.

The present invention provides norbornene-based copolymers incorporating at least one monomer selected from the group consisting of norbornene and dicyclopentadiene, and the other from norbornene-based comonomers of Formula 1, shown below.

Formula 1

In Formula 1, $R_1$ and $R_2$ are independently selected from a group consisting of hydroxy group, and linear or branched $C_{1-12}$ alkoxy group not substituted or substituted with phenyl group. The letter "a" is an integral of 0 to 4.

Moreover, the present invention provides insulating elements for multi-chip packages and antireflection films for the exposure process of semiconductor fabrication, using the norbornene-based copolymers of the present invention.

The present invention is described in detail below.

As described above, norbornene-based copolymers have excellent properties such as heat resistance, low hygroscopicity, electrical-optical isotropy, high optical transparency, and so forth. Consequently, the test on their applicability to multi-chip packages of the next generation and to optical circuit materials in optoelectronic systems is increasingly of interest. However, the norbornene-based materials in their conventional form have poor solubility to most of organic solvents and thus inevitably pose several problems in fabrication processes. These present inventors have found that when norbornene-based monomers comprising hydroxybenzene and/or alkoxybenzene are used as one comonomer component during the preparation of norbornene-based copolymers, the solubility to organic solvents of such norbornene-based copolymers are greatly improved. A detailed explanation is provided below.

In general, solubility of one polymer to many common organic solvents can be improved by introducing alkyl groups in chain form to the chemical structure of a comonomer because the alkyl groups introduced as such provide flexibility to polymer backbones and sterically hinder the intermolecular interaction among polymer chains. However, although the introduction of such alkyl groups to the polymer could increase the solubility to organic solvents, it is also known that it, at the same time, reduces the glass transition temperature (Tg) of the prepared polymer. Norbornene-based copolymers also have similar tendency to such ordinary polymers. In preparing norbornene-based copolymers, when a norbornene-based monomer decorated with alkyl groups in its chemical structure is used as one of comonomers for copolymers, the alkyl group substituted norbornene comonomer imparts the flexibility to the otherwise stiff structure of norbornene-based copolymers so as to improve the solubility of such norbornene-based copolymers to organic solvents. However, the alkyl group substituted norbornene comonomer not only imparts the structural flexibility to norbornene-based copolymers, but also decreases the glass transition temperatures (Tg) of the norbornene-based copolymers reducing thermal stability, which is one of the merits of the norbornene-based copolymers.

However, the present invention uses the norbornene-based monomers containing alkoxybenzene or hydroxybenzene as one comonomer component in preparing norbornene-based copolymers. By this rational design of new norbornene-based monomers, the present invention renders the norbornene-based copolymers with improved their solubility in many common organic solvents but still maintaining the thermal stability of the norbornene-based copolymers. More specifically, the comonomers used in the present invention not only have alkyl group(s) in alkoxy moieties but also incorporate benzene rings with planar structure. Thus, the alkyl groups in the alkoxy part of the comonomer impart flexibility to the chemical structure of the norbornene-based copolymers and sterically hinder intermolecular interactions so as to improve the solubility to many common organic solvents. At the same time, benzene rings with stiff planar chemical structure keep the glass transition temperature of the norbornene-based copolymers at high temperature so as to maintain the thermal stability of the norbornene-based copolymers. This is to say that the norbornene-based copolymers prepared according to the present invention have greatly improved solubility to most common organic solvents and, at the same time, thermal property at the level similar to norbornene homopolymer.

In the present invention not only the solubility to various organic solvents but also the thermal property of norbornene-based copolymers can be controlled. The preparation of thin films for optoelectronic systems, typically by solvent casting of the copolymers described herein prepared with one comonomer containing various kinds of alkoxybenzenes or hydroxybenzene, is thus greatly facilitated.

In the present invention, the content of the comonomer in the norbornene-based copolymers is preferably greater than 0 and less than or equal to 20 mol %. When the content of the comonomer in the norbornene-based copolymers exceed 20 mol %, the comonomer may affect properties such as mechanical and thermal properties of the prepared norbornene copolymers. In addition, the comonomers described above are expected to be quite expensive. Thus, due to the high cost of such comonomers, it is not preferable that a copolymer contains such a comonomer in excess of the above content range. Even though the content of the comonomer is no more than 5 mol % in the norbornene-based copolymers of the present invention, the comonomer can provide the above effects of the present invention.

The comonomer of Formula 1 can be easily prepared by the simple liquid phase reaction, not by high temperature and high pressure processes that are generally employed for preparing norbornene-based derivatives. For example, the comonomer of Formula 1 can be prepared by stirring starting materials such as benzoquinone-based material and cyclopentadiene in organic solvents at room temperature, and then allowing them to react together for a few hours. The starting materials to obtain the comonomer(s) of Formula 1 can be easily purchased, for example, from chemical distribution agents like Aldrich, but not limited to it only. Methods to synthesize the comonomer(s) of Formula 1 are illustrated in the following examples, and those skilled in the art can modify the methods to prepare various kinds of the comonomers according to the present invention.

Norbornene-based copolymers prepared according to the present invention include a copolymer consisting of norbornene and the comonomer of Formula 1, a copolymer consisting of dicyclopentadiene and the comonomer of Formula 1, and a copolymer consisting of norbornene, dicyclopentadiene, and the comonomer of Formula 1.

Dicyclopentadiene has a chemical structure wherein one pentagonal ring is bonded to the norbornene as shown in the formula below. Thus, the backbone structure of the copolymers containing norbornene and the comonomer of Formula 1 is nearly similar to that of a copolymer consisting of dicyclopentadiene and the comonomer of Formula 1, or to that of a copolymer consisting of norbornene, dicyclopentadiene and the comonomer of Formula 1. Accordingly, their fundamental properties such as thermal property and solubility to organic solvent are also similar.

Norbornene-based copolymers according to the present invention have the structure of Formula 2, shown below.

Formula 2

In Formula 2, $R_1$ and $R_2$ are independently selected from a group consisting of hydroxy group, and linear or branched $C_{1-12}$ alkoxy group, substituted or not substituted with phenyl group(s), the letter "a" is an integral of 0 to 4, "n" is an integral of 100 to 200, and "n" is an integral of 200 to 400, whereby each of the comonomers is located randomly in the copolymer.

Norbornene-based copolymers according to the present invention can be prepared by reacting norbornene and/or dicyclopentadiene and the comonomer of Formula 1 in a relevant solvent at room temperature. Detailed methods to prepare the norbornene-based copolymers according to the present invention are illustrated in the examples below.

Norbornene-based copolymers according to the present invention have excellent solubility to most of common organic solvents such as methylenechloride, tetrahydrofuran, benzene, toluene, chlorobenzene, chloroform, and so forth due to the norbornene-based comonomer(s) containing hydroxybenzene and/or alkoxybenzene in the copolymer.

Norbornene-based copolymers according to the present invention have enhanced adhesion property onto the substrates such as silicone wafer and metal surface. In addition, the norbornene-based copolymers according to the present invention have a glass transition temperature in the range of 300° C.~400° C., depending on the composition of the copolymers.

The present invention also provides an insulating material for a semiconductor package and an antireflective film for an exposure process of a semiconductor fabrication, prepared by using the norbornene-based copolymer of the present invention.

For example, a thin film can be easily prepared by the spin coating of the copolymer(s) prepared according to the present invention. This means that while the copolymer solution in a predetermined concentration is filtered by a filter (for example, 0.2 μm filter), the copolymer solution is immediately dropped on a silicon wafer of which the surface can also be pretreated in advance. Then, a thin-film with a desirable thickness is prepared by changing the rotational number (rpm) of a spin coater. A final thin film is formed by heat-treating the thin-film prepared as described above under air at 90~220° C. to evaporate remaining residual solvent. The heat treatment must be performed at a temperature that is no larger than the glass transition temperature of the copolymer. If the heat treatment is performed at a temperature above the glass transition temperature of the copolymer, the chains of the norbornene-based copolymer have enough activation to move the center-of-mass of each chain, enabling a roughened film surface. Films prepared described above can be used as an insulating element for multi-chip packages and also as an antireflective film in the exposure process of semiconductor fabrication.

EXAMPLES

The present invention is further illustrated or detailed in the following examples. However, the examples provided here are only for illustrating the present invention, and the present invention is not just defined by the examples provided here.

Preparation of Norbornene-Based Comonomer(s)

Example 1

Synthesis of a Norbornene Comonomer I (1,4-dihydro-1,4-methanonaphthalene-5,8-diol)

16 g of benzoquinone was added to the solution made by 10 g of cyclopentadiene dissolved in 100 mL of methylenechloride (MC) while the solution is refluxed at 150° C. Then, the mixture was cooled to 0° C. and stirred for 3 hours. A reduction reaction of the product produced by the reaction was conducted by additions of 50 mL of ethyl acetate and 20 g of aluminum oxide and by ultrasonic exposure for 1 hour. A yellowish solid was obtained and the product yield was 80% (20g).

Example 2

Synthesis of a Norbornene-Based Comonomer II (5,8-diethoxy-1,4-dihydro-1,4-methanonaphthalene)

10 g of 1,4-dihydro-1,4-methanonaphthalene-5,8-diol synthesized in Example 1 was added to 20 mL of dimethyl sulfoxide, followed by an addition of 12.9 g of KOH and the mixture was stirred for 30 minutes. 12.5 g of ethyl bromide was further added and then the mixture was reacted for 30 minutes. After the reaction, 50 mL of water and 50 mL of methylenechloride were poured into the reaction mixture for extraction. After the organic phase was separated from the aqueous phase, 5 g of Na$_2$SO$_4$ was added to the organic phase. Then, the organic phase was filtered off Na$_2$SO$_4$ and distilled off the solvent. As a result, a yellowish solid was obtained and the product yield was 99% (13.1 g).

Example 3

Synthesis of a Norbornene-Based Comonomer III (5,8-dibenzyloxy-1,4-dihydro-1,4-methanonaphthalene)

5,8-dibenzyloxy-1,4-dihydro-1,4-methanonaphthalene was prepared by performing the same process as Example 2, except that 19.6 g of benzyl bromide was used instead of 12.5 g of ethyl bromide. Yield: 96%

Example 4

Syntheses of a Norbornene-Based Comonomer IV (5,8-dioctyloxy-1,4-dihydro-1,4-methanonaphthalene)

5,8-dioctyloxy-1,4-dihydro-1,4-methanonaphthalene was prepared by performing the same process as Example 2, except that 22 g of octyl bromide was used instead of 12.5 g of ethyl bromide. Yield: 93%

Synthesis of Norbornene-Based Copolymer

Example 5 to Example 10

In a reactor containing 100 mL of methylenechloride (MC), allyl palladium chloride dimer as a catalyst and silver hexafluoroantimonate as an anion were added and then sufficiently stirred for 30 minutes by a stirrer. Then, 9 g of norbornene and 1 g of a norbornene-based comonomer described in Table 1 below were added to the reactor and the mixture was reacted at room temperature for 12 hours. Then, the mixture was dropped to a methanol/hydrochloric acid (9/1) solution (200 mL), and thus, a solid precipitation was yielded. After the precipitation was filtered and a little solvent remaining in the precipitation was removed, a white polymer was obtained.

TABLE 1

| Example | Comonomer | [Norbornene]/[Comonomer] (g/g) | [Catalyst]/[Monomer] | Yield |
|---|---|---|---|---|
| 5 | Example 1 | 9/1 | 1/500 | 45% |
| 6 | Example 2 | 9/1 | 1/125 | 75% |
| 7 | Example 2 | 9/1 | 1/250 | 69% |
| 8 | Example 2 | 9/1 | 1/500 | 78% |
| 9 | Example 3 | 9/1 | 1/500 | 72% |
| 10 | Example 4 | 9/1 | 1/500 | 75% |

Example 11 to Example 24

[Pd(CH$_3$CH$_2$CN)$_4$][SbF$_6$]$_2$ was added as a catalyst to a reactor containing 100 mL of methylenechloride and the mixture was stirred for 30 minutes. Then, norbornene and the norbornene-based comonomer prepared in Examples 1 to 4 were added in an amount described in Table 2 below and the mixture was reacted at room temperature for 12 hours. The mixture was dropped to a methanol/hydrochloric acid (9/1) solution (200 mL) to form a precipitation. After the precipitation was filtered and a small amount of solvent remaining in the precipitation was removed under vacuum, a white polymer was obtained.

TABLE 2

| Example | Comonomer | [Norbornene]/[Comonomer] (g/g) | [Catalyst]/[Monomer] | Yield |
|---|---|---|---|---|
| 11 | Example 2 | 9/1 | 1/125 | 82% |
| 12 | Example 2 | 9/1 | 1/250 | 80% |
| 13 | Example 2 | 9/1 | 1/500 | 78% |
| 14 | Example 2 | 9/1 | 1/1000 | 77% |
| 15 | Example 2 | 9.5/0.5 | 1/125 | 70% |
| 16 | Example 2 | 9.5/0.5 | 1/500 | 72% |

TABLE 2-continued

| Example | Comonomer | [Norbornene]/[Comonomer] (g/g) | [Catalyst]/[Monomer] | Yield |
|---|---|---|---|---|
| 17 | Example 2 | 8/2 | 1/125 | 56% |
| 18 | Example 2 | 8/2 | 1/500 | 63% |
| 19 | Example 3 | 0/10 | 1/50 | 7% |
| 20 | Example 3 | 9/1 | 1/125 | 76% |
| 21 | Example 3 | 9/1 | 1/500 | 72% |
| 22 | Example 4 | 0/10 | 1/50 | 4% |
| 23 | Example 4 | 9/1 | 1/125 | 56% |
| 24 | Example 4 | 9/1 | 1/500 | 45% |

Solubility of Norbornene-Based Copolymer in Organic Solvent

Comparative Experiment 1, Experiments 2 to 5

Solubility in organic solvents was determined for a conventional norbornene homopolymer (PNB) and norbornene-based copolymers of the present invention prepared in Examples 5, 13, 21 and 24. The results are shown in Table 3 below. Solubility was determined by dissolving 0.5 g of each polymer in 1 mL of each solvent. When the polymer dissolves in the solvent, it is shown as O. When the polymer does not dissolve in the solvent, it is shown as X.

TABLE 3

| Solvent (Relative Polarity) | Comparable Experiment 1 (PNB) | Experiment 2 (Example 5) | Experiment 3 (Example 13) | Experiment 4 (Example 21) | Experiment 5 (Example 24) |
|---|---|---|---|---|---|
| Toluene (2.3) | X | O | O | O | O |
| Chloroform (4.8) | X | O | O | O | O |
| THF (7.6) | X | O | O | O | O |
| Methylene chloride (MC) (8.9) | X | O | O | O | O |
| Chlorobenzene | O | O | O | O | O |

In Table 3, the numbers in parenthesis next to the name of the solvent indicate relative polarity. The higher the number, the higher the polarity.

As described in Table 3, norbornene homopolymer (PNB) dissolved in only chlorobenzene, but copolymers according to the present invention dissolved in chloroform, THF and methylenechloride that have relatively high polarity. In addition, while PNB displayed low solubility of 0.1 g/mL in chlorobenzene, copolymers prepared in Examples 5, 13, 21 and 24 displayed solubility above 1 g/mL.

Thermal Stability of Norbornene-Based Copolymers

Figure 1:
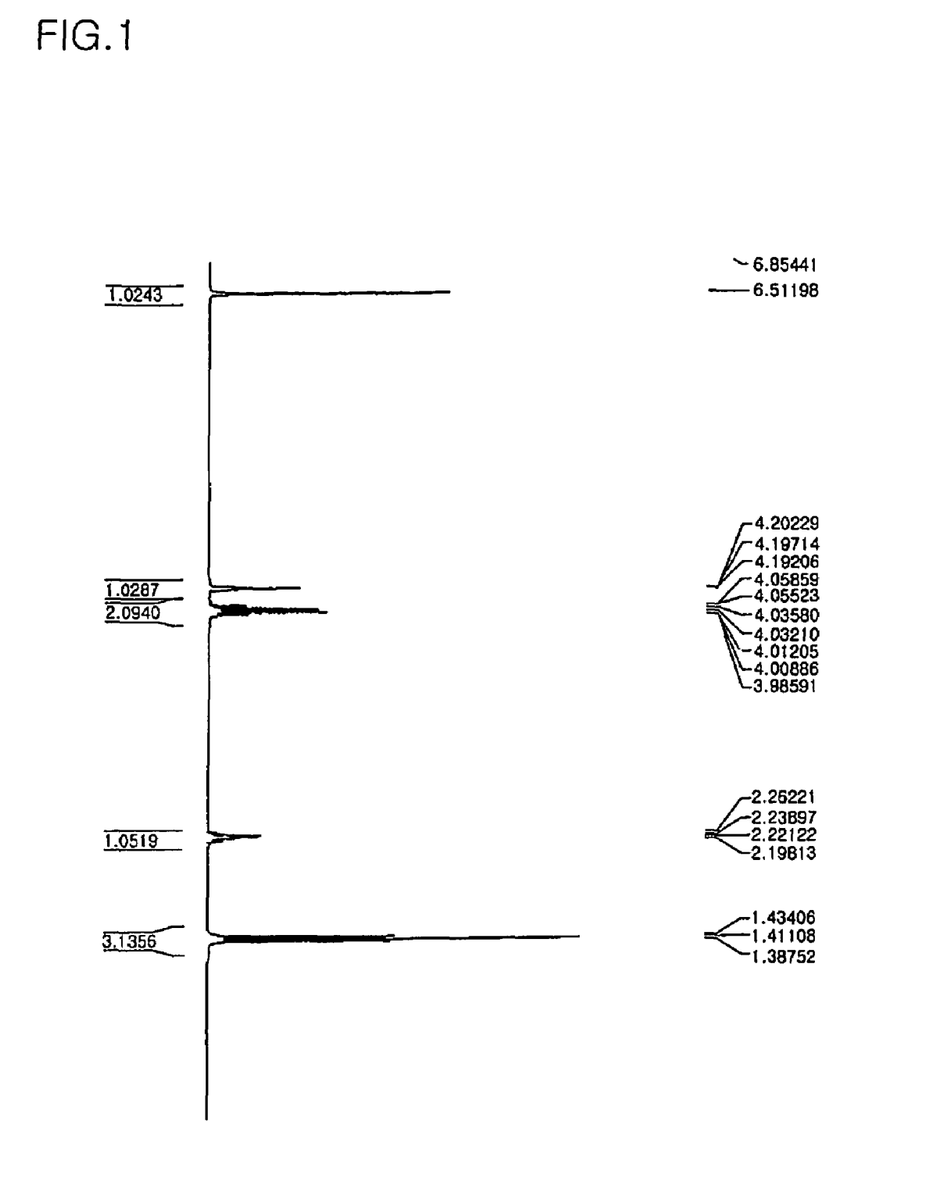
FIG. 1 represents the $^1$H-NMR spectrum of the norbornene-based comonomer of Example 2 according to the present invention.
Figure 2:
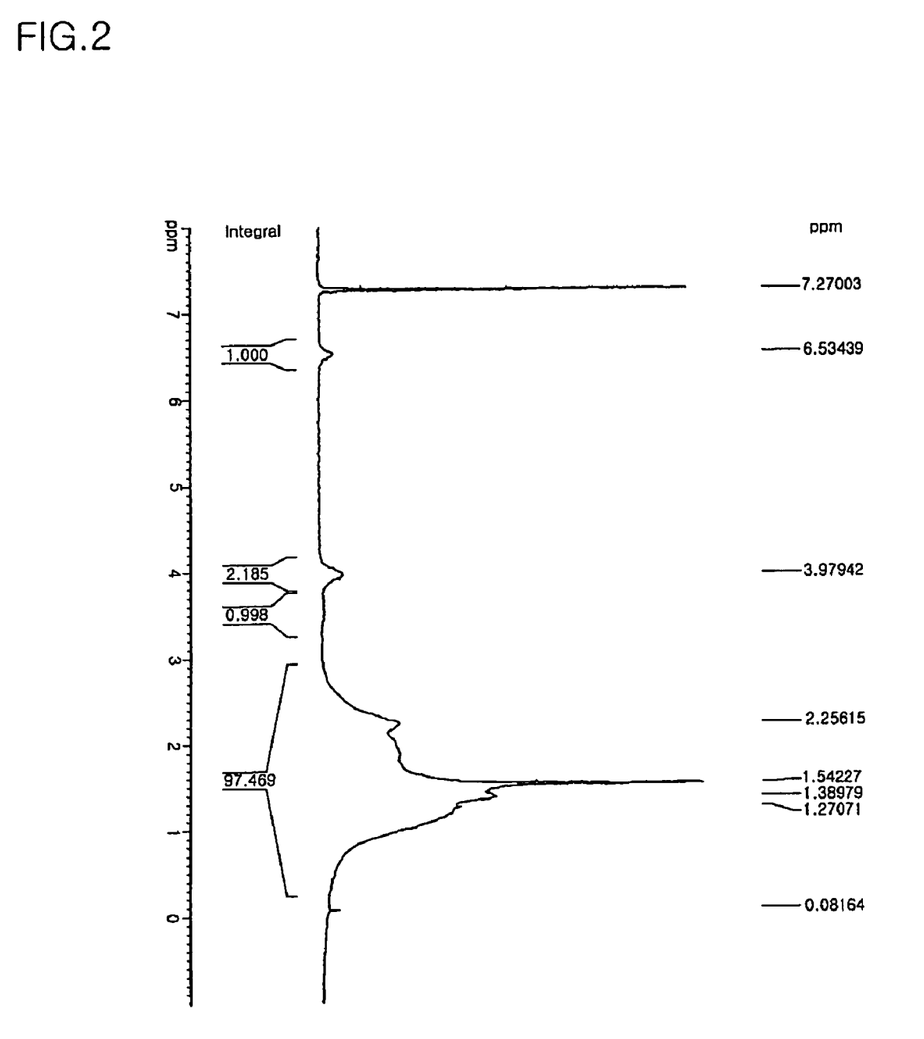
FIG. 2 represents the $^1$H-NMR spectrum of the norbornene-based comonomer of Example 8 according to the present invention.
Figure 3:
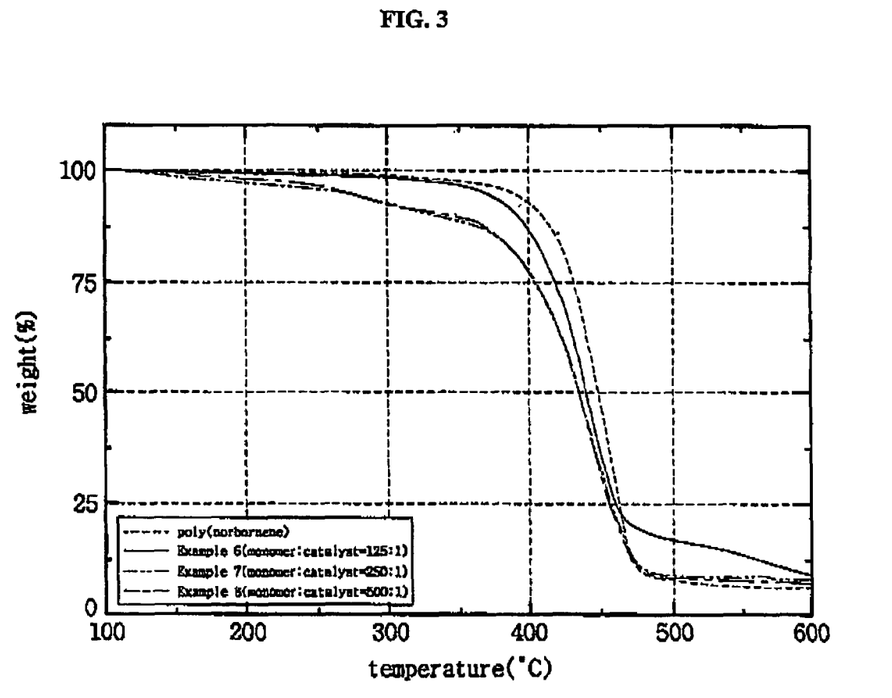
FIGS. 3 to 5 are the graphs showing thermal degradation behavior of norbornene-based copolymers depending on the content of norbornene-based comonomers according to the present invention.
Figure 4:
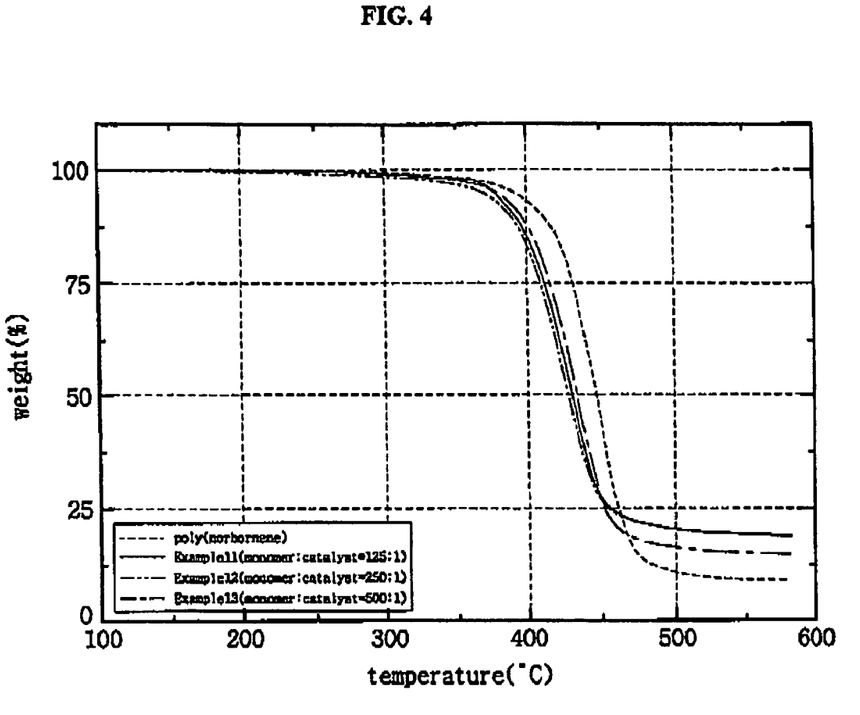
Figure 5:
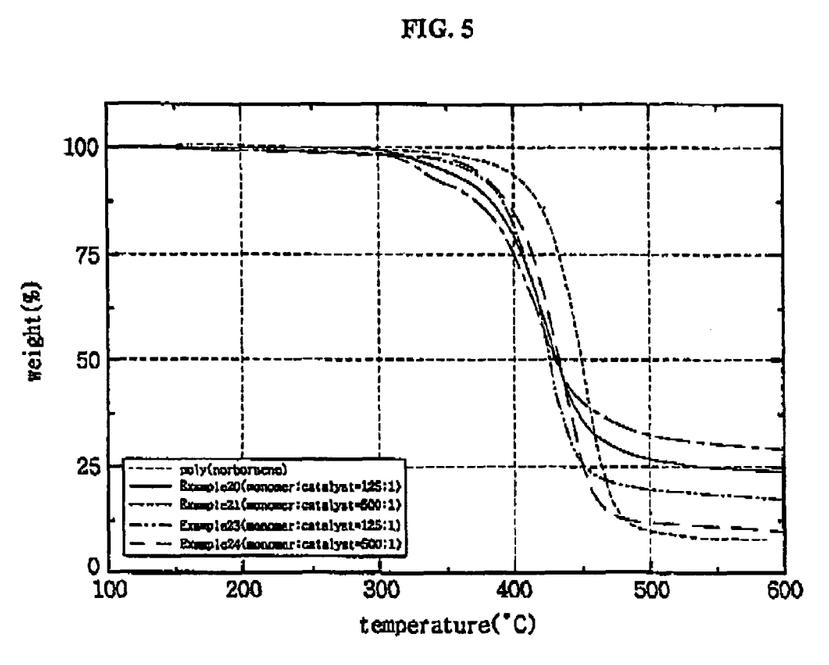

Thermal analysis results for the norbornene-based copolymer of the present invention prepared in Examples 6 to 8 are shown in FIG. 3. Thermal analysis results for the copolymer in Examples 11 to 13 are shown in FIG. 4. Thermal analysis results for the copolymer in Examples 20, 21, 23 and 24 are shown in FIG. 5. Through these figures, it is found that the thermal stability of the copolymers prepared in the examples according to the present invention is similar to that of a conventional norbornene homopolymer.

Figure 6:
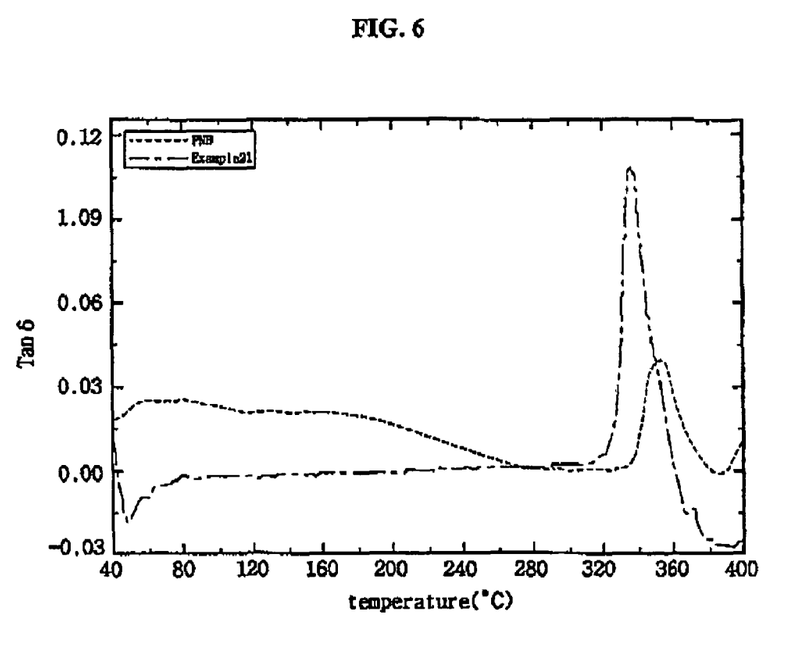
FIG. 6 is the graph representing the glass transition temperature of the norbornene-based copolymer of Example 21 according to the present invention.

In addition, FIG. 6 shows a glass transition temperature determined for norbornene homopolymer (PNB) and the copolymer prepared in Example 21 (Dynamic Mechanical Analysis). As shown in FIG. 6, the glass transition temperature of the copolymer prepared in Example 21 is lower than that of PNB by about 20° C. Because the glass transition temperature of norbornene copolymer comprising alkyl groups is generally lower than that of PNB by 100° C., the glass transition temperature of the copolymer in Example 21 is not significantly different from that of PNB.

Adhesion Property

The adhesion force of the copolymers onto a substrate (typically, silicon wafer) is qualitatively tested by the tape test and the stud-pull test, as documented in the ASTM D335997 and ASTM D517902, respectively. Although the tape test does not yield any quantitative adhesion values, it is regarded as a simple and easy method to check preliminary adhesion against a substrate of interest to screen many possible candidate materials. For the tape test, the norbornene-based copolymers were spin-coated on silicon wafers. Scotch tape was then applied firmly to a fixed area of the film and removed quickly from the surface of the film. The copolymer film, after removal of a scotch tape, was checked under a microscope to check any delamination that could occur as a result of the adhesive failure at the interface between the copolymer film and the substrate. In the case where no delamination was observed under the microscope, the copolymer films were immersed in boiling water for one hour. If the copolymer film is not peeled off from the substrate during the test, the copolymer film is classified as a film with good adhesion. From this tape test (reliability was confirmed with repeated experiments more than 3 times with freshly prepared), we are able to compare the relative adhesion property among PNB and the copolymer in Examples 13, 21, and 24, as summarized in Table 4.

TABLE 4

| Entry | Film Thickness (μm) | Tape Test |
|---|---|---|
| PNB | 0.8 ± 0.05[a] | Fail |
| Example 13 | 1.2 ± 0.07 | Pass |
| Example 21 | 0.6 ± 0.05 | Pass |
| Example 24 | 0.9 ± 0.05 | Pass |

Figure 7:
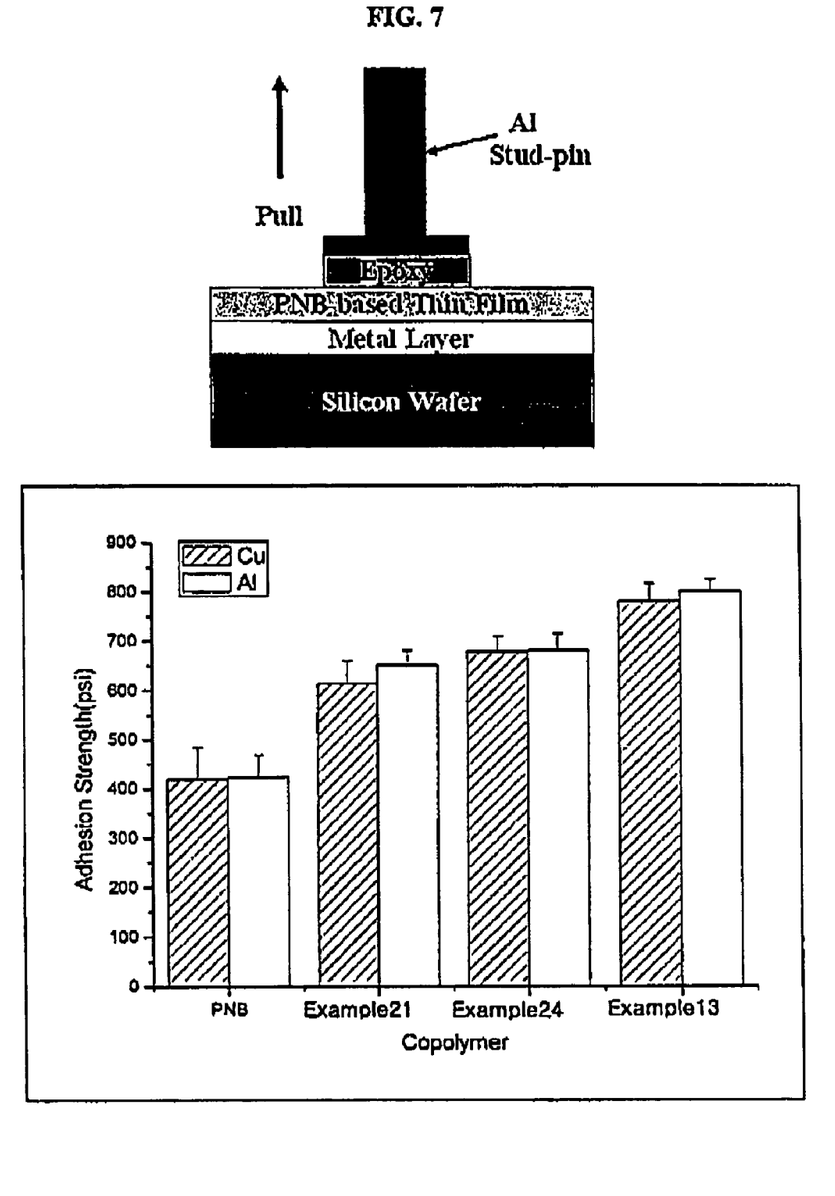
FIG. 7 represents the method of stud-pull test and the graph of the adhesion strength of norbornene polymers.

More quantitative data for the adhesion of the copolymers were obtained from the stud-pull test by ASTM D 517902. The adhesion between polymer and metal was tested by pulling the stubs apart in an Instron at a crosshead speed of 50 mm/min. The adhesion strength was calculated by dividing the force necessary to separate the stubs by the area of the upper stub. The adhesion of norbornene copolymers to aluminum and copper was tested by detection of failure at the interface between the polymer and metal. In FIG. 7, the copolymers have stronger adhesion strength than norbornene homopolymer because of the oxygen functional group in the comonomer. And the copolymer in Examples 21 and 24 has less strength than the copolymer in Example 13.

This indicates that the bulky groups may decrease the number of the functional group interacting with the metal as a substrate. As the bulky groups increase the free volume of the polymer, it is conceivable that there are less functional groups actually present at the interface to participate in reactions with metal.

Test for Analysis of Electrical-Optical Property of Thin Film Formed by Using Norbornene-Based Copolymer The solution was prepared by dissolving 20 wt % of the copolymer prepared according to the present invention in mesitylene. Then, thin film of the solution was prepared by spin coating at 2000 rpm for 30 seconds. The thickness of the thin film was determined at about 2 μm by a Prism Coupler. Then, the thin film was subjected to a heat treatment at 250 to 450° C. to prepare a copolymer thin film.

To determine the electrical property of the thin film, aluminum electrode was deposited on the thin film under vacuum. More particularly, the aluminum electrode was obtained in uniform thickness of about 100 nm by depositing aluminum under the condition of 5 mm of diameter, no more than $10^{-5}$ torr of pressure, and no more than 0.5 nm/sec of evaporating rate.

Electrical properties of copolymers were determined by calculating a dielectric constant from a maximum capacitance value of a C-V (Capacitance-Voltage) curve in MIS (Metal-Insulator-Semiconductor) structure. The dielectric constants of the copolymers are shown in Table 4 below.

TABLE 4

| Copolymer | Thickness of Thin Film (μm) | Dielectric Constant, k | Index of Refraction (@632 nm) |
|---|---|---|---|
| Example 8 | 1.5 | 2.42 | 1.508 |
| Example 9 | 1.43 | 2.45 | 1.492 |
| Example 10 | 0.9 | 2.55 | 1.500 |
| Example 11 | 1.38 | 2.12 | 1.27 |
| Example 13 | 1.39 | 2.48 | 1.483 |
| Example 15 | 1.42 | 2.28 | 1.32 |
| Example 18 | 1.41 | 2.12 | 1.27 |
| Example 21 | 1.01 | 2.48 | 1.492 |
| Example 24 | 0.96 | 2.48 | 1.492 |

As described in Table 3, while the dielectric constant of the conventional norbornene homopolymer was 2.6, the dielectric constants of the norbornene-based copolymers prepared in the examples were lower than 2.6

INDUSTRIAL APPLICABILITY

Norbornene-based copolymer of the present invention is prepared by using a norbornene-based monomer having hydroxybenzene and/or alkoxybenzene as a comonomer, so as to have an excellent solubility to an organic solvent, thermal stability of similar level to a conventional norbornene homopolymer, and low dielectric constant. Thus, the norbornene-based copolymers of the present invention are useful as an insulating material for a multi-chip package of the next-generation and an antireflective film used in the exposure process of semiconductor fabrication.

The invention claimed is:

1. Norbornene-based copolymers containing at least one monomer selected from the group of norbornene and dicyclopentadiene, and the other norbornene-based comonomer of Formula 1 shown below:

Formula 1 wherein, in Formula 1,
R$_1$ and R$_2$ are independently selected from a group consisting of hydroxy group, and linear or branched $C_{1-12}$ alkoxy groups, substituted or not substituted with phenyl groups; and
"a" is an integral of 0 to 4.

2. Norbornene-based copolymers according to claim 1, wherein the content of the norbornene-based comonomer of Formula 1 in norbornene-based copolymers is greater than 0 and less than or equal to 20 mol %.

3. Norbornene-based copolymers according to claim 1, being copolymers of Formula 2:

Formula 2 wherein, in Formula 2,
R$_1$ and R$_2$ are independently selected from a group consisting of hydroxy group, and linear or branched $C_{1-12}$ alkoxy groups, not substituted or substituted with phenyl groups;
"a" is an integral of 0 to 4;
"m" is an integral of 100-200;
"n" is an integral of 200-400; and
each of the comonomers is located randomly in the copolymer.

4. Insulating materials for multi-chip packaging, using the norbornene-based copolymers according to claim 1.

5. Insulating materials for multi-chip packaging, using the norbornene-based copolymers according to claim 2.

6. Insulating materials for multi-chip packaging, using the norbornene-based copolymers according to claim 3.

7. An antireflective film for use in semiconductor fabrication, comprising:
norbornene-based copolymers containing at least one monomer selected from the group of norbornene and dicyclopentadiene, and the other norbornene-based comonomer of Formula 1 shown below:

Formula 1 wherein, in Formula 1, $R_1$ and $R_2$ are independently selected from a group consisting of hydroxy group, and linear or branched $C_{1-12}$ alkoxy groups, substituted or not substituted with phenyl groups; and "a" is an integral of 0 to 4.

8. The antireflective film of claim 7, wherein the content of the norbornene-based comonomer of Formula 1 in norbornene-based copolymers is greater than 0 and less than or equal to 20 mol %.

9. The antireflective film of claim 7, wherein the norbornene-based copolymers are copolymers of Formula 2:

Formula 2 wherein, in Formula 2, $R_1$ and $R_2$ are independently selected from a group consisting of hydroxy group, and linear or branched $C_{1-12}$ alkoxy groups, not substituted or substituted with phenyl groups;

"a" is an integral of 0 to 4;

"m" is an integral of 100-200;

"n" is an integral of 200-400; and each of the comonomers is located randomly in the copolymer.

10. A semiconductor fabrication method comprising:

using an antireflective film during the exposure process, wherein the antireflective film comprises norbornene-based copolymers containing at least one monomer selected from the group of norbornene and dicyclopentadiene, and the other norbornene-based comonomer of Formula 1 shown below:

Formula 1 wherein, in Formula 1, $R_1$ and $R_2$ are independently selected from a group consisting of hydroxy group, and linear or branched $C_{1-12}$ alkoxy groups, substituted or not substituted with phenyl groups; and "a" is an integral of 0 to 4.

11. The semiconductor fabrication method of claim 10 wherein the content of the norbornene-based comonomer of Formula 1 in norbornene-based copolymers is greater than 0 and less than or equal to 20 mol %.

12. The semiconductor fabrication method of claim 10 wherein the norbornene-based copolymers are copolymers of Formula 2:

Formula 2 wherein, in Formula 2, $R_1$ and $R_2$ are independently selected from a group consisting of hydroxy group, and linear or branched $C_{1-12}$ alkoxy groups, not substituted or substituted with phenyl groups;

"a" is an integral of 0 to 4;

"m" is an integral of 100-200;

"n" is an integral of 200-400; and each of the comonomers is located randomly in the copolymer.

* * * * *